United States Patent
Xie

(10) Patent No.: US 10,683,210 B2
(45) Date of Patent: Jun. 16, 2020

(54) SYNTHESIS OF MOLECULAR SIEVE SSZ-56

(71) Applicant: Chevron U.S.A. Inc., San Ramon, CA (US)

(72) Inventor: Dan Xie, Richmond, CA (US)

(73) Assignee: CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 16/551,835

(22) Filed: Aug. 27, 2019

(65) Prior Publication Data
US 2020/0062605 A1   Feb. 27, 2020

Related U.S. Application Data

(60) Provisional application No. 62/723,371, filed on Aug. 27, 2018.

(51) Int. Cl.
*C01B 39/12*      (2006.01)
*B01J 29/86*      (2006.01)
*C01B 39/48*      (2006.01)
*C01B 39/02*      (2006.01)
*B01J 29/70*      (2006.01)

(52) U.S. Cl.
CPC .............. *C01B 39/48* (2013.01); *B01J 29/70* (2013.01); *B01J 29/86* (2013.01); *C01B 39/026* (2013.01); *C01B 39/12* (2013.01); *C01P 2002/72* (2013.01); *C01P 2004/03* (2013.01)

(58) Field of Classification Search
CPC ..... C01B 39/12; C01B 39/48; C01P 2002/72; C01P 2004/03; B01J 29/70; B01J 29/86
See application file for complete search history.

(56) References Cited

U.S. PATENT DOCUMENTS

| | | | |
|---|---|---|---|
| 5,187,132 A | 2/1993 | Zones et al. | |
| 7,226,576 B2 | 6/2007 | Elomari | |
| 7,390,395 B2* | 6/2008 | Elomari | B01J 29/04 208/108 |
| 8,647,602 B2 | 2/2014 | Elomari et al. | |
| 2006/0292071 A1 | 12/2006 | Elomari | |
| 2013/0330272 A1 | 12/2013 | Elomari et al. | |
| 2020/0062605 A1* | 2/2020 | Dan | C01B 39/48 |

FOREIGN PATENT DOCUMENTS

WO     2018110860 A1    6/2018

OTHER PUBLICATIONS

PCT International Search Report, International Patent Appl. No. PCT/IB2019/057202, dated Dec. 2, 2019.
K.R. Franklin and B.M. Lowe "Crystallization of silica molecular sieves from piperazine-quaternary ammonium bromide-silica-water systems" Zeolites 1988, 8, 501-507.
S. Elomari, A. Burton, R.C. Medrud and R. Grosse-Kunstleve "The synthesis, characterization, and structure solution of SSZ-56: An extreme example of isomer specificity in the structure direction of zeolites" Micropor. Mesopor. Mater. 2009, 118, 325-333.

* cited by examiner

*Primary Examiner* — David M Brunsman

(57) ABSTRACT

A method is provided for synthesizing a molecular sieve having the framework structure of SSZ-56 using benzyltributylammonium cations as a structure directing agent.

10 Claims, 2 Drawing Sheets

SYNTHESIS OF MOLECULAR SIEVE SSZ-56

CROSS-REFERENCE TO RELATED APPLICATIONS

This application claims priority to and the benefit of U.S. Provisional Application Ser. No. 62/723,371, filed Aug. 27, 2018.

FIELD

This disclosure relates to the synthesis of crystalline molecular sieves having the framework structure of SSZ-56.

BACKGROUND

SSZ-56 is a molecular sieve possessing a unique two-dimensional channel system of intersecting 12-ring and 10-ring pores. The framework structure of SSZ-56 has been assigned the three-letter code SFS by the Structure Commission of the International Zeolite Association.

The composition and characterizing X-ray diffraction pattern of molecular sieve SSZ-56 are disclosed in U.S. Pat. No. 7,226,576, which also describes the synthesis of the molecular sieve in the presence of a structure directing agent comprising a trans-fused ring N,N-diethyl-2-methyldecahydroquinolinium cation.

U.S. Pat. No. 8,647,602 discloses the synthesis of aluminosilicate SSZ-56 using a 1-butyl-1-(3,3,5-trimethylcyclohexyl)piperidinium cation as a structure directing agent.

There remains a need in finding alternative, less expensive structure directing agents for the synthesis of SSZ-56.

According to the present disclosure, it has now been found that relatively simple benzyltributylammonium cations can be effective as a structure directing agent in the synthesis SSZ-56.

SUMMARY

In one aspect, there is provided a method of synthesizing a molecular sieve of SFS framework type, the method comprising: (a) forming a reaction mixture comprising: (1) a borosilicate beta zeolite; (2) a source of a Group 1 or Group 2 metal (M); (3) a structure directing agent (Q) comprising benzyltributylammonium cations; (4) a source of hydroxide ions; and (5) water; and (b) subjecting the reaction mixture to crystallization conditions sufficient to convert the borosilicate beta zeolite to a molecular sieve of SFS framework type.

In another aspect, there is provided a molecular sieve of SFS framework type and, in its as-synthesized form, comprising benzyltributylammonium cations in its pores.

DETAILED DESCRIPTION

Definitions

Figure 1:
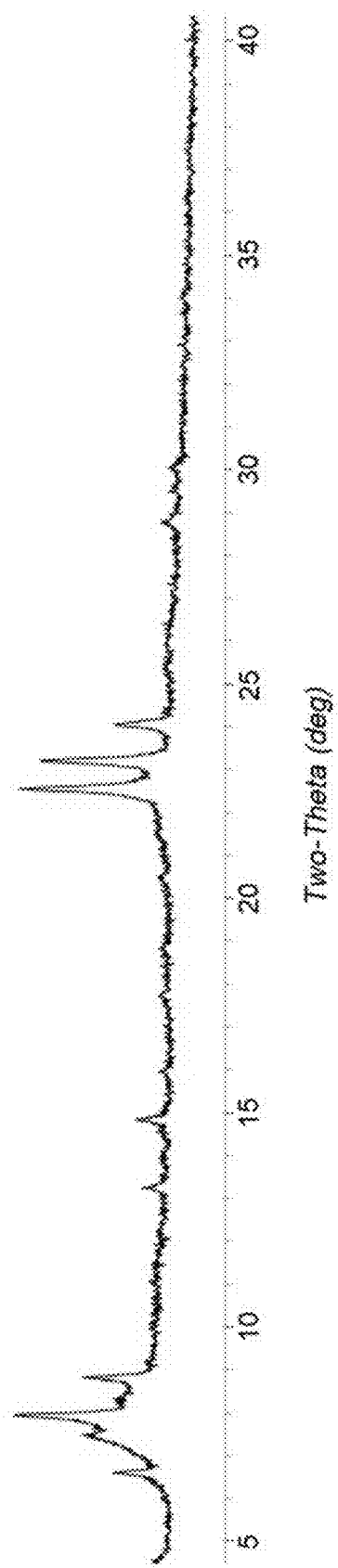
FIG. 1 shows a powder X-ray diffraction (XRD) pattern of the as-synthesized molecular sieve prepared in Example 1.

The term "framework type" as used herein has the meaning described in the "*Atlas of Zeolite Framework Types,*" by Ch. Baerlocher, L. B. McCusker and D. H. Olson (Elsevier, Sixth Revised Edition, 2007).

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Synthesis of the Molecular Sieve

A molecular sieve of SFS framework type can be synthesized by: (a) forming a reaction mixture comprising: (1) a borosilicate beta zeolite; (2) a source of a Group 1 or Group 2 metal (M); (3) a structure directing agent (Q) comprising benzyltributylammonium cations; (4) a source of hydroxide ions; and (5) water; and (b) subjecting the reaction mixture to crystallization conditions sufficient to convert the borosilicate beta zeolite to a molecular sieve of SFS framework type.

The reaction mixture may have a composition, in terms of molar ratios, within the ranges set forth in Table 1:

TABLE 1

| Reactants | Useful | Exemplary |
| --- | --- | --- |
| $SiO_2/B_2O_3$ | ≥10 | 50 to 200 |
| $M/SiO_2$ | 0.05 to 0.50 | 0.05 to 0.20 |
| $Q/SiO_2$ | 0.05 to 0.50 | 0.10 to 0.30 |
| $OH/SiO_2$ | 0.05 to 0.50 | 0.15 to 0.40 |
| $H_2O/SiO_2$ | 10 to 80 | 15 to 50 | wherein M is a Group 1 or Group 2 metal; and Q comprises benzyltributylammonium cations.

The borosilicate beta zeolite can have a $SiO_2/B_2O_3$ molar ratio of at least 10 (e.g., 50 to 200). The borosilicate beta zeolite can comprise two or more borosilicate beta zeolites having different $SiO_2/B_2O_3$ molar ratios.

The Group 1 or Group 2 metal (M) can be any M-containing compound not detrimental to crystallization process can be used. The Group 1 or Group 2 metal may be sodium or potassium. Sources of the Group 1 or Group 2 metal may include metal hydroxide, metal oxide, metal halide, metal sulfate, metal nitrate, and metal carboxylate. As used here, the phrase "Group 1 or Group 2 metal" does not mean the Group 1 metals and Group 2 metals are used in the alternative, but instead that one or more Group 1 metals can be used alone or in combination with one or more Group 2 metals and that one or more Group 2 metals can be used alone or in combination with one or more Group 1 metals.

The structure directing agent (Q) comprises benzyltributylammonium cations, represented by the following structure (1):

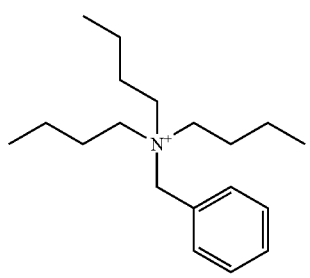

(1)

Suitable sources of Q are the hydroxides and/or other salts of the quaternary ammonium compound.

The reaction mixture may also contain seeds of a molecular sieve of SFS framework type, such as SSZ-56 from a previous synthesis, desirably in an amount of from 0.01 to 15,000 ppm by weight (e.g., from 100 to 12,000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-56 over any undesired phases.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the desired molecular sieve from the above reaction mixture can be carried out under either static, tumbled or stirred conditions in a suitable reactor vessel, such as for example polypropylene jars or Teflon-lined or stainless-steel autoclaves, at a temperature of from 125° C. to 200° C. (e.g., 140° C. to 170° C.) for a time sufficient for crystallization to occur at the temperature used(e.g., from about 50 to 500 hours. Crystallization is usually carried out in an autoclave so that the reaction mixture is subject to autogenous pressure.

Once the desired molecular sieve crystals have formed, the solid product can be separated from the reaction mixture by standard mechanical separation techniques such as centrifugation or filtration. The crystals can be water-washed and then dried to obtain the as-synthesized molecular sieve crystals. The drying step can be performed at an elevated temperature (e.g., 75° C. to 150° C.) for several hours (e.g., 4 to 24 hours). The drying step can be performed under vacuum or at atmospheric pressure.

As a result of the crystallization process, the recovered crystalline molecular sieve product contains within its pores at least a portion of the structure directing agent used in its synthesis.

The as-synthesized molecular sieve may be subjected to treatment to remove part or all of the structure directing agent used in its synthesis. Removal of the structure directing agent may be carried out by thermal treatment (e.g., calcination) in which the as-synthesized molecular sieve is heated at a temperature sufficient to remove part or all of the structure directing agent. While sub-atmospheric pressure may be used for the thermal treatment, atmospheric pressure is desired for reasons of convenience. The thermal treatment may be performed at a temperature at least 370° C. for at least a minute and generally not longer than 20 hours (e.g., from 1 to 12 hours). The thermal treatment can be performed at a temperature of up to 925° C. For example, the thermal treatment may be conducted at a temperature of 400° C. to 600° C. in the presence of an oxygen-containing gas for approximately 1 to 8 hours. Additionally or alternatively, the structure directing agent can be removed by treatment with ozone.

Any Group 1 or Group 2 metal cations in the molecular sieve can be replaced in accordance with techniques well known in the art (e.g., by ion exchange) with other cations. Replacing cations can include metal ions hydrogen ions, hydrogen precursor ions (e.g., ammonium ions), and combinations thereof. Particularly preferred replacing cations are those which tailor the catalytic activity for certain organic conversion reactions. These can include hydrogen, rare earth metals, and metals of Groups 2 to 15 of the Periodic Table of the Elements.

Aluminum-containing forms of SSZ-56 may be prepared by post-synthetic replacement of boron in the borosilicate framework of SSZ-56 with aluminum. Replacement of boron in the framework of borosilicate SSZ-56 with aluminum can be achieved by suitable treatment with an aluminum salt (e.g., aluminum nitrate). Such heteroatom lattice substitution techniques are described, for example, in U.S. Pat. Nos. 6,468,501 and 6,790,433. At least 5% (e.g., at least 10%, at least 25%, or at least 50%) of boron in the borosilicate framework of SSZ-56 may be replaced with aluminum using such techniques.

SSZ-56 can be formulated into a catalyst composition by combination with other materials, such as binders and/or matrix materials, which provide additional hardness or catalytic activity to the finished catalyst. When blended with such components, the relative proportions of SSZ-56 and matrix may vary widely with the SSZ-56 content ranging from 1 to 90 wt. % (e.g., from 2 to 80 wt. %) of the total catalyst.

Characterization of the Molecular Sieve

In its as-synthesized and anhydrous form, the present molecular sieve can have a chemical composition comprising the following molar relationship set forth in Table 2:

TABLE 2

|  | Broad | Exemplary |
| --- | --- | --- |
| $SiO_2/B_2O_3$ | ≥10 | 50 to 200 |
| $Q/SiO_2$ | >0 to 0.1 | >0 to 0.1 |
| $M/SiO_2$ | >0 to 0.1 | >0 to 0.1 | wherein Q comprises benzyltributylammonium cations; and M is a Group 1 or Group 2 metal.

As taught by U.S. Pat. No. 7,226,576, molecular sieve SSZ-56 has a powder X-ray diffraction pattern which, in its as-synthesized form, includes at least the peaks set forth in Table 3 below and which, in its calcined form, includes at least the peaks set forth in Table 4.

TABLE 3

Characteristic Peaks for As-Synthesized SSZ-56

| 2-Theta[a] | d-spacing, nm | Relative Intensity[b] |
| --- | --- | --- |
| 6.58 | 1.343 | M |
| 7.43 | 1.188 | M |
| 7.93 | 1.114 | S |
| 8.41 | 1.051 | M |
| 13.22 | 0.669 | M |
| 13.93 | 0.595 | M |
| 14.86 | 0.595 | M |

TABLE 3-continued

Characteristic Peaks for As-Synthesized SSZ-56

| 2-Theta[a] | d-spacing, nm | Relative Intensity[b] |
|---|---|---|
| 22.59 | 0.393 | VS |
| 23.26 | 0.382 | VS |
| 24.03 | 0.370 | S |

[a] ±0.10
[b] The powder XRD pattern provided is based on a relative intensity scale in which the strongest line in the XRD pattern is assigned a value of 100: W = weak (>0 to <20); M = medium (≥20 to ≤40); S = strong (>40 to ≤60); VS = very strong (>60 to ≤100).

TABLE 4

Characteristic Peaks for Calcined SSZ-56

| 2-Theta[a] | d-spacing, nm | Relative Intensity[b] |
|---|---|---|
| 6.54 | 1.351 | VS |
| 7.36 | 1.197 | VS |
| 7.89 | 1.120 | VS |
| 8.35 | 1.058 | VS |
| 8.81 | 1.003 | S |
| 13.16 | 0.672 | M |
| 14.83 | 0.596 | M |
| 22.48 | 0.395 | VS |
| 23.24 | 0.382 | VS |
| 23.99 | 0.370 | S |

[a] ±0.10
[b] The powder XRD pattern provided is based on a relative intensity scale in which the strongest line in the XRD pattern is assigned a value of 100: W = weak (>0 to <20); M = medium (≥20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

EXAMPLES

The following illustrative examples are intended to be non-limiting.

Example 1

14.93 g of deionized water, 0.13 g of a 50% aqueous NaOH solution, 6.74 g of a 21.04% benzyltributylammonium hydroxide solution, and 2.00 g of borosilicate beta-zeolite ($SiO_2/B_2O_3$ molar ratio~100) were mixed together in a Teflon liner. The resulting gel was stirred until it became homogeneous. The liner was then capped and sealed within a Parr steel autoclave reactor. The autoclave was then placed an oven and heated at 150° C. for 7 days under static conditions. The solid products were recovered from the cooled reactor by centrifugation, washed with deionized water and dried at 95° C.

Figure 2:
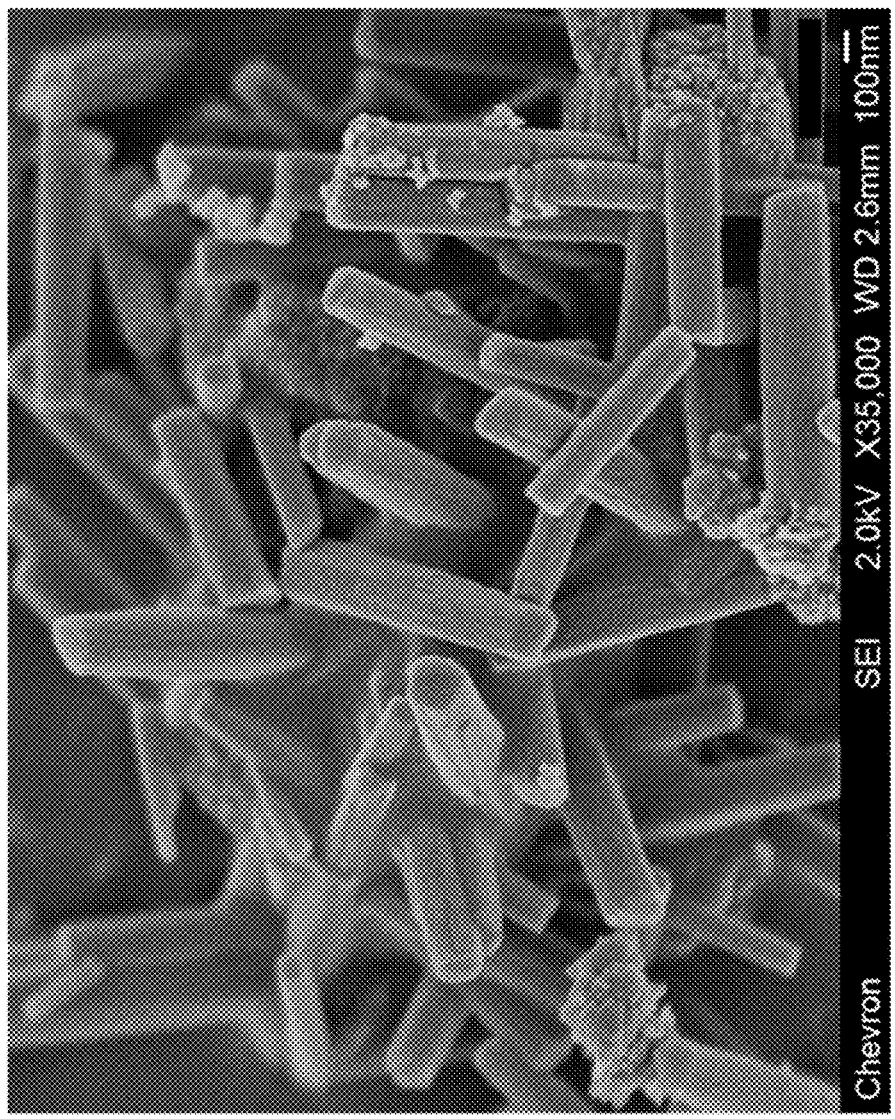
FIG. 2 shows a Scanning Electron Micrograph (SEM) image of the as-synthesized molecular sieve prepared in Example 1.

The resulting product was analyzed by powder XRD and SEM. The powder XRD pattern of the product is shown FIG. 1 and is consistent with the product being SSZ-56. A SEM image of the product is shown in FIG. 2 and indicates a uniform field of crystals.

The product had a $SiO_2/B_2O_3$ molar ratio of 136.8, as determined by Inductively Coupled Plasma (ICP) elemental analysis.

Example 2

22.32 g of deionized water, 0.30 g of a 45% aqueous KOH solution, 10.11 g of a 21.04% benzyltributylammonium hydroxide solution, and 3.00 g of borosilicate beta-zeolite ($SiO_2/B_2O_3$ molar ratio~100) were mixed together in a Teflon liner. The resulting gel was stirred until it became homogeneous. The liner was then capped and sealed within a Parr steel autoclave reactor. The autoclave was then placed an oven and heated at 150° C. for 7 days under static conditions. The solid products were recovered from the cooled reactor by centrifugation, washed with deionized water and dried at 95° C.

The resulting product was analyzed by powder XRD and SEM and shown to be a pure SSZ-56 molecular sieve.

The product had a $SiO_2/B_2O_3$ molar ratio of 131.4, as determined by ICP elemental analysis.

Example 3

16.64 g of deionized water, 0.26 g of a 50% aqueous NaOH solution, 4.49 g of a 21.04% benzyltributylammonium hydroxide solution, and 2.00 g of borosilicate beta-zeolite ($SiO_2/B_2O_3$ molar ratio~100) were mixed together in a Teflon liner. The resulting gel was stirred until it became homogeneous. The liner was then capped and sealed within a Parr steel autoclave reactor. The autoclave was then placed an oven and heated at 150° C. for 7 days under static conditions. The solid products were recovered from the cooled reactor by centrifugation, washed with deionized water and dried at 95° C.

The resulting product was analyzed by powder XRD and SEM and shown to be to be shown to be a mixture of SSZ-56 and the dense phase cristobalite.

Example 4

Example 1 was repeated with the exception that 10 wt. % seed crystals of borosilicate SSZ-56 from a previous synthesis were added to the reaction mixture. The solid products were recovered after 5 days of reaction.

The resulting product was identified by powder XRD and SEM to be a pure SSZ-56 molecular sieve.

Example 5

The as-synthesized molecular sieve of Example 1 was calcined inside a muffle furnace under a flow of a mixture of nitrogen and air heated to 540° C. at a rate of 1° C./minute and held at 540° C. for 5 hours, cooled and analyzed by powder XRD. The powder XRD data indicated that the material remains stable after calcination to remove the organic matter.

Example 6

The calcined material of Example 5 had a micropore volume of 0.17 cm³/g based on argon adsorption isotherm at 87.50 K (−186° C.) recorded on ASAP 2010 equipment from Micromeritics. The sample is first degassed at 400° C. for 16 hours prior to argon adsorption. The low-pressure dose is 2.00 cm³/g (STP). A maximum of one hour equilibration time per dose is used and the total run time is 37 hours. The argon adsorption isotherm is analyzed using the density function theory (DFT) formalism and parameters developed for activated carbon slits by J.P. Olivier (*J. Porous Mater.* 1995, 2, 9-17) using the Saito Foley adaptation of the Horvarth-Kawazoe formalism (*Micropor. Mater.* 1995, 3, 531-542) and the conventional t-plot method (*J. Catal.* 1965, 4, 319-323).

The invention claimed is:

1. A method of synthesizing a molecular sieve of SFS framework type, the method comprising:
    (a) forming a reaction mixture comprising:
        (1) a borosilicate beta zeolite;
        (2) a source of a Group 1 or Group 2 metal (M);
        (3) a structure directing agent (Q) comprising benzyltributylammonium cations;
        (4) a source of hydroxide ions; and
        (5) water; and
    (b) subjecting the reaction mixture to crystallization conditions sufficient to convert the borosilicate beta to a molecular sieve of SFS framework type.

2. The method of claim 1, wherein the reaction mixture has a composition, in terms of molar ratios, as follows:

| | |
|---|---|
| $SiO_2/B_2O_3$ | ≥10 |
| $M/SiO_2$ | 0.05 to 0.50 |
| $Q/SiO_2$ | 0.05 to 0.50 |
| $OH/SiO_2$ | 0.05 to 0.50 |
| $H_2O/SiO_2$ | 10 to 80. |

3. The method of claim 1, wherein the reaction mixture has a composition, in terms of molar ratios, as follows:

| | |
|---|---|
| $SiO_2/B_2O_3$ | 50 to 200 |
| $M/SiO_2$ | 0.05 to 0.20 |
| $Q/SiO_2$ | 0.10 to 0.30 |
| $OH/SiO_2$ | 0.15 to 0.40 |
| $H_2O/SiO_2$ | 15 to 50. |

4. The method of claim 1, wherein the reaction mixture also contains seeds.

5. The method of claim 4, wherein the reaction mixture comprises from 0.01 to 15,000 ppm by weight of seeds.

6. The method of claim 4, wherein the seeds comprise a molecular sieve of SFS framework type.

7. The method of claim 1, wherein the crystallization conditions include a temperature of from 125° C. to 200° C.

8. A molecular sieve of SFS framework type and, in its as-synthesized form, comprising benzyltributylammonium cations in its pores.

9. The molecular sieve of claim 8, having a molar ratio of $SiO_2/B_2O_3$ of at least 10.

10. The molecular sieve of claim 9, wherein the molar ratio of $SiO_2/B_2O_3$ is in a range of from 50 to 200.

* * * * *